Feb. 19, 1952 W. H. NEELY 2,586,698
PADDING AND COVER MEMBERS FOR UPHOLSTERED SPRING STRUCTURES
Filed Dec. 26, 1945 4 Sheets-Sheet 1
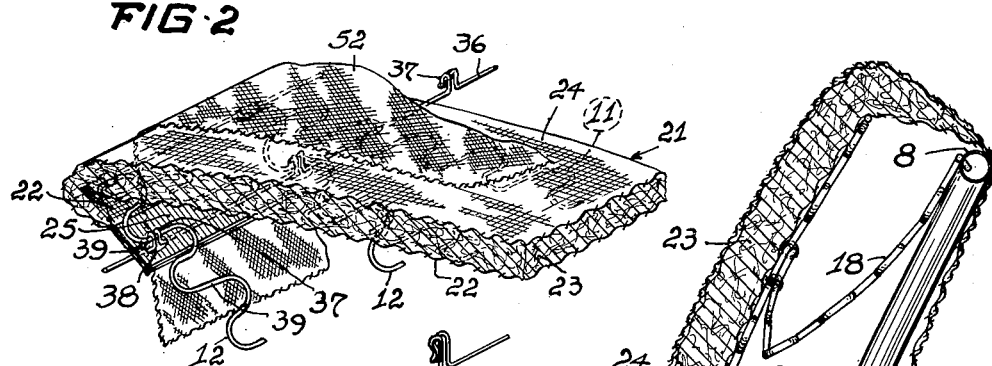
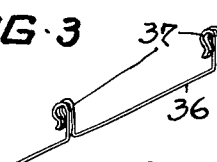
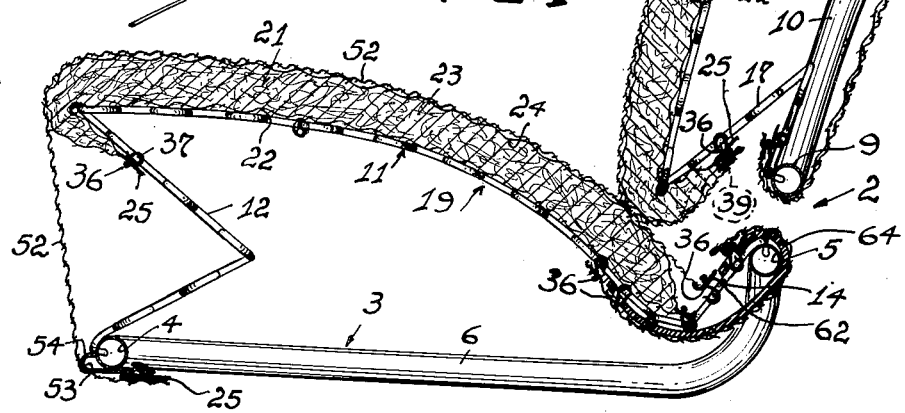
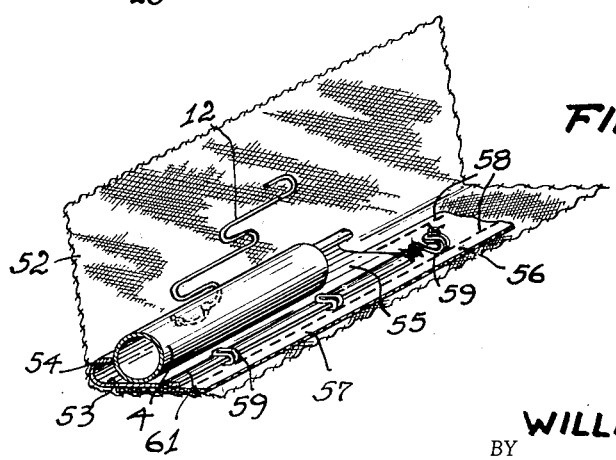
INVENTOR.
WILLIAM H. NEELY
BY *Gustav A. Wolff*
ATT.

Feb. 19, 1952   W. H. NEELY   2,586,698
PADDING AND COVER MEMBERS FOR UPHOLSTERED SPRING STRUCTURES
Filed Dec. 26, 1945   4 Sheets-Sheet 2

INVENTOR.
WILLIAM H. NEELY
BY Gustav A. Wolff
ATT.

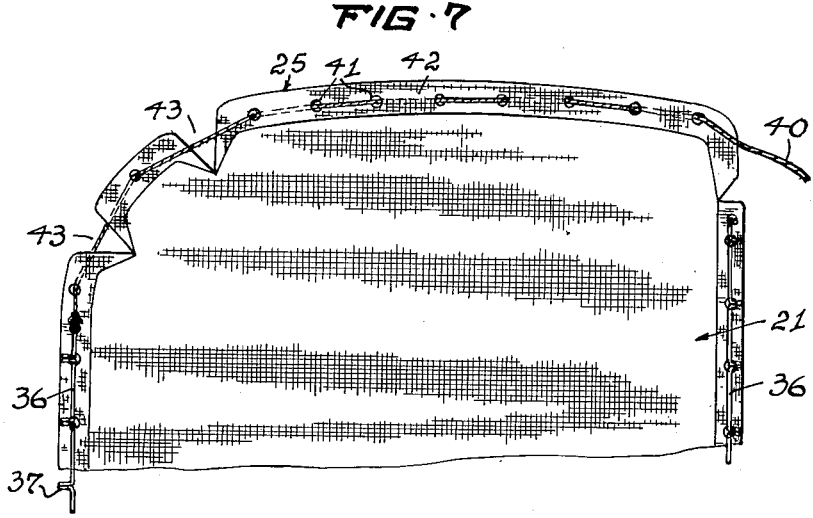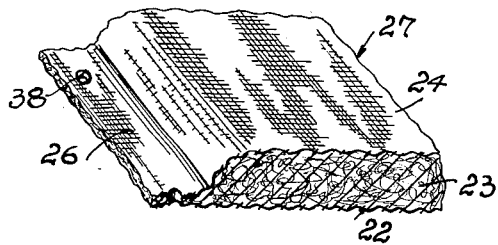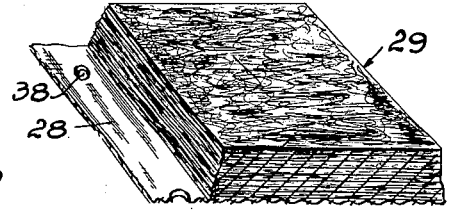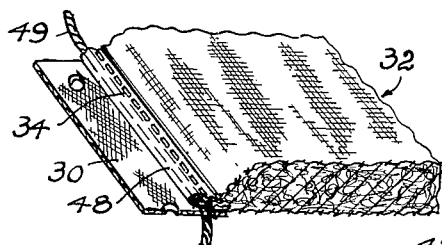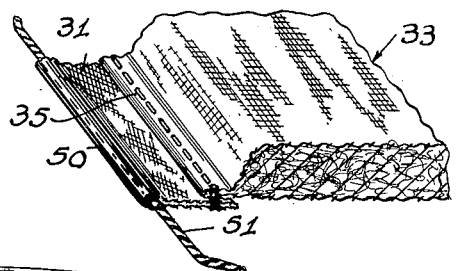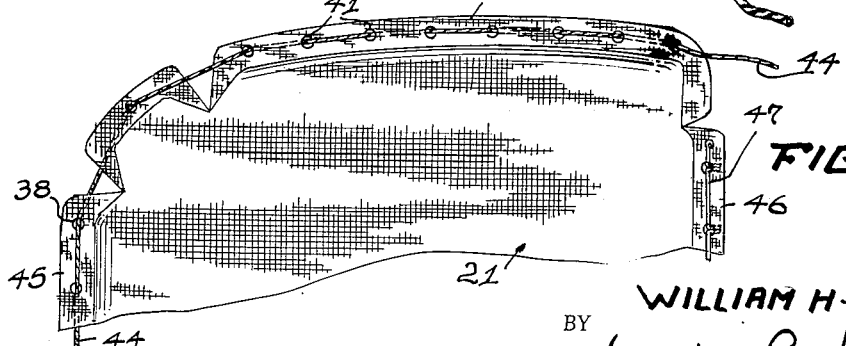

Feb. 19, 1952     W. H. NEELY     2,586,698
PADDING AND COVER MEMBERS FOR UPHOLSTERED SPRING STRUCTURES
Filed Dec. 26, 1945     4 Sheets-Sheet 4
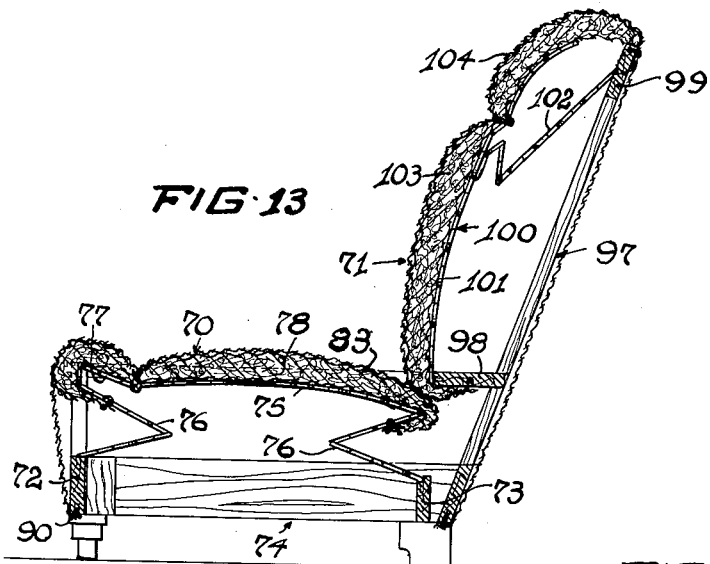
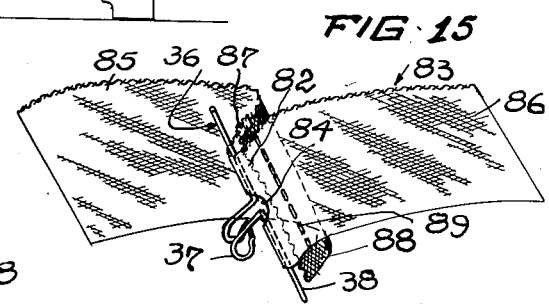
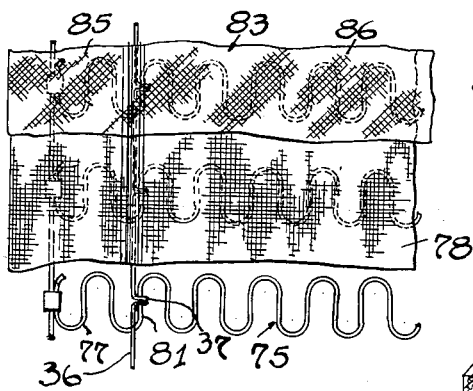
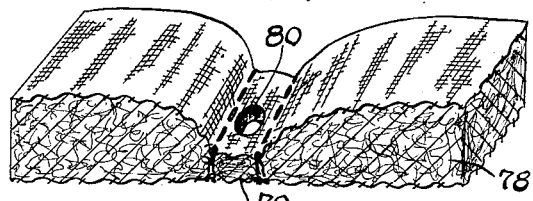
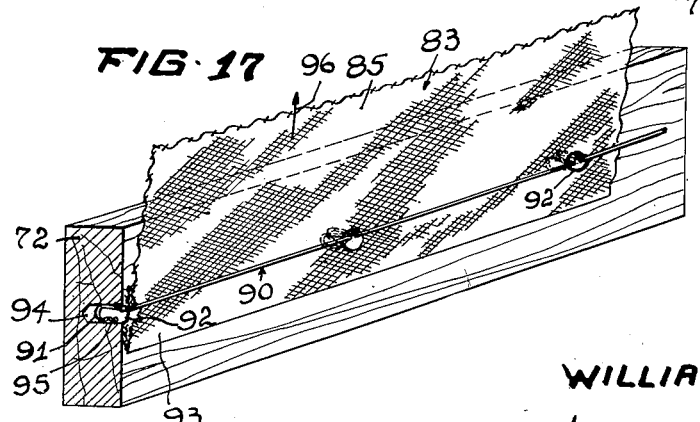
INVENTOR.
WILLIAM H. NEELY
ATT Patented Feb. 19, 1952

2,586,698

UNITED STATES PATENT OFFICE 2,586,698

PADDING AND COVER MEMBERS FOR UPHOLSTERED SPRING STRUCTURES

William H. Neely, Cleveland, Ohio, assignor to The Universal Wire Spring Company, Cleveland, Ohio, a corporation of Ohio Application December 26, 1945, Serial No. 637,220

7 Claims. (Cl. 155—179)

This invention relates in general to upholstered spring constructions for vehicle seats, upholstered furniture and the like, and, more particularly, to improved padding and cover members for such spring constructions and their attachment to these spring constructions.

The general object of the present invention is the provision of improved padding and cover members fashioned for simple, quick and readily removable attachment to spring constructions.

Such a general object of the invention is attained by padding and cover members constructed with reenforced, stiffened border areas and hook-shaped means associated with the border areas of said members so as to permit quick, readily removable attachment of the padding and cover members to spring constructions.

Another object of the invention therefore is the provision of padding and cover members with reenforced, stiffened, preferably rim-like border areas and hook-shaped attachment means associated and cooperating with these border areas in removably attaching these padding and cover members to spring constructions.

A padding member fashioned with reenforced, stiffened and perforated border areas is readily removably attached to a spring construction by wire members with hook portions extended through the perforations in these border areas and hooked to the springs and frame of such spring constructions.

Wire members of this type embodying a plurality of hook portions may also serve as anchoring means for a cover member including hook-shaped or similar attachment means in its border area, as such hook-shaped attachment means can readily be hooked upon the wires of the wire members to effect simple, readily removable attachment of such a cover member to a spring structure when padded with a thus constructed pad.

A further object of the invention therefore is the provision of a padding member embodying perforated, reenforced border areas, and an elongated wire member formed with spaced, hook-shaped means extended laterally from said wire member through the perforations of the padding member for removable attachment of the padding member to a spring construction.

Still another object of the invention is the provision of an upholstered spring structure embodying a padding member fashioned with perforated, reenforced border areas, wire attachment means including spaced, laterally arranged hook means extended through the perforations of the padding member and hooked to the spring structure, and a cover member for said padding member, the cover member including in its border area hook-shaped attachment means hooked upon the wire of the wire attachment means.

In addition, the invention has certain other marked superiorities which radically distinguish it from presently known structures. These improvements or superiorities embodying certain novel features of construction are clearly set forth in the following specification and the appended claims; and several preferred forms of embodiment of the invention are hereinafter shown with reference to the accompanying drawings forming part of the specification.

In the drawings:

Fig. 1 is a cross sectional view through an automobile seat structure embodying padding and cover members constructed in accordance with the invention;

Fig. 2 is a fragmentary perspective view of the seat portion of a seat structure such as shown in Fig. 1, disclosing the hooked attachment of a pad to the spring of a spring seat structure;

Fig. 3 is a fragmentary perspective view of the wire hook member used in the hooked attachment of the pads shown in Figs. 1 and 2;

Fig. 4 is a fragmentary perspective view of the hooked attachment of a cover member to the frame of a seat structure such as shown in Fig. 1;

Fig. 7 is a fragmentary plan view of a padding member constructed in accordance with the invention embodying in its reenforced, stiffened border area wire hook and draw cord means for readily removably attaching the padding member to a spring seat structure;

Figs. 8 through 11 show fragmentary sectional views through differently constructed padding members built in accordance with the invention, thus Fig. 8 is a fragmentary sectional view through a padding member embodying a perforated stiffened border area formed by compression of the border area;

Fig. 9 is a fragmentary sectional view through a padding member with a base member including a reenforced, stiffened and perforated border area;

Figure 5:
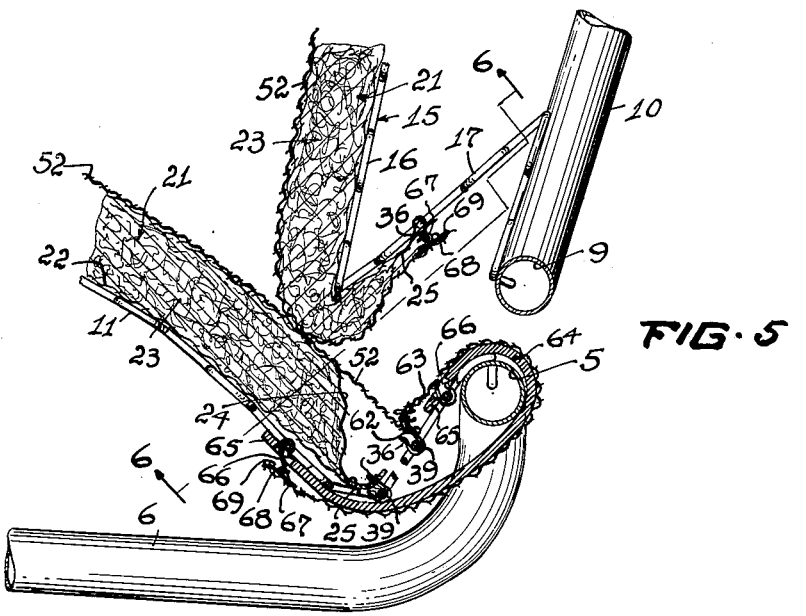
Fig. 5 is a fragmentary sectional view through an automobile seat structure with padding and cover member attached in a somewhat different manner to the springs and frames of the seat structure.

Fig. 10 is a fragmentary sectional view through a padding member embodying a reenforced, stiffened and perforated border area formed by a separate strip of material sewn to the body of the padding member and draw cord means for the body of the padding member extended through a sleeve at the edge of said body; and Fig. 11 is a fragmentary sectional view through a padding member with a separate strip of material forming a reenforced, stiffened border area and provided with sleeve means at the outer edge of the strip having extended therethrough draw cord means;

Fig. 12 is a fragmentary plan view of a padding member similarly constructed to the member shown in Fig. 7, with the exception that draw cord means are arranged on the front and side edges of the padding member;

Fig. 13 is a sectional view through an upholstered spring seat structure embodying a wooden frame mounting sinuously shaped springs and padding members built in accordance with the invention secured to the springs and wooden frame of the seat structure;

Fig. 14 is a fragmentary plan view of the seat of the seat structure partly broken away to show attachment of the cover and padding members to the springs between the border areas of said members;

Fig. 15 is a perspective fragmentary view of the cover member carrying in a perforated sleeve portion a wire hook member; and Fig. 16 is a perspective fragmentary view of the padding member showing its compressed area and one of the perforations through which the hooks of the wire hook member extend;

Fig. 17 is a fragmentary perspective view of one of the rails of the wooden frame of the spring seat structure shown in Fig. 15, with the cover member attached to the rail by a hook-shaped wire member having its hooks extended through holes in said cover member into bores of said rail.

Referring now more particularly to the automobile seat shown in Fig. 1, reference numeral 2 denotes a tubular frame construction embodying an open seat frame 3 with front, rear and side rails 4, 5 and 6 and an open back frame 7 with top, bottom and side rails 8, 9 and 10. Open seat frame 3 has mounted on its front and rear rails 4 and 5 a plurality of flat springs 11, made of sinuously shaped or horizontally corrugated steel wire, which springs include at their front ends V-shaped front supporting means 12 attached to front rail 4 and are shaped at their rear ends with upwardly extended portions 14 attached or secured to rear rail 5. Open back frame 7 has mounted on its top and bottom rails 8 and 9 a plurality of flat, sinuously shaped steel wire springs 15 which bridge said frame and each of which springs embodies a continuous main portion 16 with a V-shaped supporting arm 17 connected to bottom rail 9 and, as additional support, a V-shaped portion 18 attached to main portion 16 between the opposite ends thereof and rearwardly and substantially upwardly extended from said main portion toward top rail 8 to which portion 18 is connected.

The seat and back spring structures 19 and 20 of the automobile seat are padded by padding members 21 which are provided with reenforced, preferably stiffened border areas cooperating with attachment means for attaching padding members 21 to spring structures 19 and 20. For this purpose, each padding member embodies a base 22 of burlap or other suitable material, superposed, preferably bonded layers of stuffing 23 (jute, cotton, hair, wool, etc.) supported on the base and bonded thereto, a burlap covering 24 for the stuffing layers, and a reenforced, stiffened border area 25 of less thickness than the central portion of the padding member. This border area may be formed by compressing and impregnating the border edge of a padding member with a plastic or other suitable material (see the border edge 26 of padding member 27 shown in Fig. 8) by impregnating the border edge of the base of a padding member (see the border edge 28 of padding member 29 in Fig. 9) and by attaching a stiffened border strip to the edge of the padding member (see the border strips 30, 31 of padding member 32, 33 in Figs. 10 and 11), which border strips are sewn at 34 and 35 to the edges of the respective padding members.

Padding members with thus constructed border areas are removably attached to spring structures 19 and 20 by wire hook members 36, the laterally offset hook portions 37 of which extend through perforations 38 in the reenforced, stiffened border areas 25 of the padding members and are hooked on the respective cross members 39 of steel wire springs 11 and 15. These wire hook members are made of straight wire bent at spaced points to form the laterally offset hook portions 37 which, preferably, are shaped to yieldingly grip cross members 39 of springs 11 and 15.

Padding members for spring structures generally are folded around the edges of these spring structures to permit proper attachment of the members and proper upholstery of the exposed edges of the spring structures. Folding of a padding member such as 21 around the side edges of a spring seat structure is facilitated by draw cords 40 threaded through the perforations 41 in the side border areas 42 of the reenforced, stiffened border area 25 of the padding member. Such draw cords, preferably, have their ends attached to wire hook member 36 at the front edge of the padding member (see Fig. 7). Padding members of this type, when used for spring structures with rounded corners, are formed with cut-out portions 43 to permit proper folding of these members around the corners by actuation of draw cords 40 which, as shown in Fig. 12, may also be used for folding both front and side edges of a padding member over the front and side edges of a spring structure. In this case, draw cord 44 is threaded through the perforations 38 of the front border area 45 and the perforations 41 of the side border areas 42, while the rear border area 46 is designed for cooperation with a wire hook member 47 adapted to removably attach this rear border area to the springs of a spring structure.

The draw cords referred to above may be threaded through special sleeve means arranged at the edge of a padding member, see Fig. 10 in which the padding member 32 includes a sleeve 48 carrying a draw cord 49, and Fig. 11 in which the border strip 31 of padding member 33 is formed with a sleeve 50 carrying a draw cord 51.

Padding member 21 when mounted on spring seat structure 19 is covered by a cover member 52 stretched over said padding member. This cover member has its front and side edges removably attached to a channelled metal strip 53 secured by welding or other suitable means to the front and side rails 4 and 6 of frame construction 2 and has its rear edge removably attached to springs 11 of spring seat structure 19. For such purpose, channeled strip 53, the channelled portion 54 of which extends slightly forward of front rail 4 to prevent wear and tear on the cover member by the end portions of front supporting means 12 of springs 11, is rearwardly extended beyond the front rail to form said rail with a rearwardly exposed flange 55 adapted to engage with attachment means 56 on the front and side edges of cover member 52. These attachment means consist of an elongated strip 57 of tape, which strip is sewn at 58 to the edge of cover member 52, and carries securely attached thereto a plurality of laterally spaced hook members 59 constructed to engage and yieldingly interlock with flange 55 when hook members 59 are hooked upon flange 55 and have their ends slightly extended over a ridge 61 in said flange (see Fig. 4). The rear edge of cover member 52 embodies a preferably reenforced perforated border area 62 cooperating with a wire hook member 36 in removably securing such rear edge of the cover member to cross members 39 of springs 11.

The rear rail 5 of frame structure 2 is partly encircled by a strip of cover material 63 which is held in proper position by hook means cooperating with perforated, reenforced border areas of the material or is hooked to the wire of a wire hook member 36, as will be later described. This cover material is stretched around a heavy guard member 64 of felt, leather or similar material which partly circles rear rail 5, engages the top and bottom faces of the rear ends of springs 11 and has its border areas 65 perforated at 66 and secured to the springs by wire hook means 36, the hook portion 37 of which engage the cross members 39 of said springs.

Figure 6:
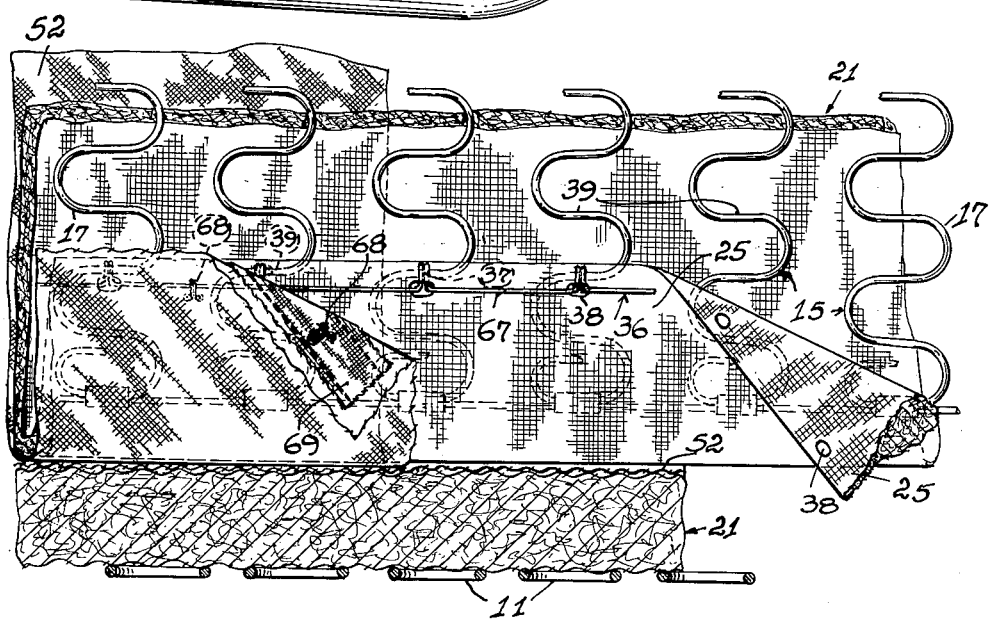
Fig. 6 is a sectional view, partly in elevation on line 6—6 of Fig. 5.

Wire hook members 36, when extended with their hook portions 37 through the perforations 38 of a reenforced border area 25 of padding member 21 or the perforations 66 of guard member 64 or the reenforced border area of cover member 52 for hook engagement with the cross members 39 of springs or other suitable means, also clampingly engage these reenforced border areas of padding member 21, guard member 64 and cover member 62, respectively, and thus help in properly attaching these members to the spring structure. When thus attached, the straight wire portions 67 of wire hook members 36 form anchoring means permitting removable attachment of the edges of cover member 52 and strip 63 by engagement of their hook means 68 with the straight wire portion 67, hook means 68 being secured to a tape 69 sewn to said cover member and strip in the manner described above and shown in Figs. 5 and 6 of the drawings.

Padding and cover members constructed as described above are readily usable for upholstered furniture having spring structures assembled from springs with elevated front edges to permit proper support of seat cushions on a padded spring structure. A construction of this type is shown in Fig. 13 disclosing an upholstered piece of furniture with a seat member 70 and a back rest 71. Seat member 70 mounts on the front and rear rails 72 and 73 of its open frame 74 a plurality of sinuously corrugated wire springs 75 which at their opopsite ends are formed with V-shaped supporting arms 76 secured to said rails and which have upwardly and outwardly bent front portions 77. The springs 75 provide an elevated seating surface properly supporting a padding member 78 which is constructed similar to padding members 21 previously described, that is, padding member 78 includes reenforced perforated border areas adapted to cooperate with wire hook members 36 in securing the edges of the padding to springs 75. In addition, padding member 78 is attached to springs 75 between the opposite ends of the padding member. For this purpose, padding member 78 includes an elongated compressed and perforated area 79 formed by compressing double stitching and cutting of the padding member to permit threading of hook portions 37 of a wire hook member 36 through perforations 80 in area 79 and engagement of hook portions 37 with cross members 81 of springs 75. Wire hook member 36 is extended through the sleeve 82 of a cover member 83 for padding member 78, and this cover member has its sleeve 82 perforated at 84 to openly expose hook portions 37 of wire hook member 36. Cover member 83 includes a front portion 85 and a rear portion 86, which rear portion has its inner end portion 87 folded around end portion 88 of front portion 85 and sewed thereto at 89 to form the sleeve 82 for the wire hook member 36 extended through said sleeve.

Cover member 83 is directly attached to the front and side rails of frame 74 by wire hook members 90 having somewhat opened up hook portions 91 which are threaded through perforations 92 in the doubled up border area 93 of cover member 83 and extended into bores 94 in said rails. The hook portions 91 are so arranged that their outwardly offset ends 95 extend downwardly into bores 94, that is, in a direction opposite to the direction of the upward pull (see arrow 96 in Fig. 17) of cover member 83, and the bores 92 are dimensioned to slightly compress the hook portions 37 when forced into said bores to effect interlocking of the outwardly offset ends 95 with the walls of bores 92.

The back rest 71 embodies an open frame 97, the bottom rail 98 of which is forwardly extended with respect to top rail 99. Frame 97 is bridged by a plurality of elongated wire springs 100 assembled from load carrying spring members 101 and supporting spring members 102 secured to the top and bottom rails 99 and 98 and coupled with each other in any suitable manner. Springs 100 provide a yielding surface properly supporting a padding member 103 which is constructed similar to padding member 78. A cover member 104, similar to cover member 83, covers the padding member and is attached together with said padding member to springs 100 between their opposite ends to effect a bolster-like trim of back rest 71. Padding member 103 has its reenforced and perforated border edges secured to top and bottom rails 99, 98 in the manner disclosed in Fig. 17, and the reenforced border edges of the cover member are hooked to the wire of wire hook members, such as disclosed in Fig. 17, in the manner shown in Fig. 6.

Having thus described my invention, what I claim is:

1. In an upholstered spring structure a spring construction assembled from a plurality of wire springs, a pad having a burlap base member seated on said spring construction, said burlap member including a stiffened, perforated border strip, and individual, elongated wire means having hook portions between their ends, said hook portions of said wire means being freely extended through the perforations in said border strip and hooked to the springs of said spring construction to removably attach said pad to the springs of said spring construction.

2. In an upholstered spring structure a spring construction, a pad having a burlap base member seated on said spring construction, said burlap base member including a stiffened, perforated border strip and a compressed, perforated recess lengthwise thereof, and individual, elongated wire means having hook portions between its opposite ends freely extended through the perforations in the stiffened border strip and the perforated recess of said pad, said hook portions of said elongated means being hooked to the springs of said spring construction and removably attaching the pad to the springs of said spring construction.

3. In an upholstered spring structure a spring construction, a pad having a burlap base member seated on said spring construction, a cover member provided with hook members near its border edge, said burlap base member including a stiffened, perforated border strip, and individual, elongated wire means including hook-shaped portions freely, removably extended from the top of said stiffened border strip through its perforations to freely expose the wire means between its hook-shaped portions, said cover member being stretched over said pad and having its hook members hooked over the exposed wire means between its hook-shaped portions.

4. In an upholstered spring structure a spring construction assembled from sinuously corrugated, elongated wire springs, a pad having a burlap base member supported on said spring construction, a stiffened perforated border strip on said pad, and individual elongated attachment means having portions removably extended through the perforations of said stiffened border strip of said pad and removably attached to the corrugations of the individual springs of said spring construction for securing said pad thereto.

5. In an upholstered spring structure a spring construction assembled from sinuously corrugated, elongated wire springs, a pad with a stiffened, perforated border strip supported on said spring construction and folded around some of its edges, and individual elongated attachment means having portions removably extended through the perforations of said border strip and removably attached to the individual springs of said spring construction below the top surface thereof.

6. An upholstered spring structure of the type described in claim 5, wherein said individual elongated attachment means consist of elongated wire members having laterally spaced hook portions, said hook portions being freely removably extended through the perforations of said border strip and removably hooked to the corrugations of the individual springs of said spring structure.

7. In an upholstered spring structure a spring construction, a pad supported by said spring construction including a stiffened, perforated border strip, individual elongated wire members including laterally spaced hook portions freely removably extended from the top of said stiffened, perforated border strip through perforations and removably hooked to individual springs of said spring structure, and a cover member provided with hook members near its border edge, said cover member being stretched over said pad and having its hook members removably hooked to the said individual elongated wire members between the hook portions thereof.

WILLIAM H. NEELY.

REFERENCES CITED

The following references are of record in the file of this patent:

UNITED STATES PATENTS

| Number | Name | Date |
| --- | --- | --- |
| 332,432 | Peters | Dec. 15, 1885 |
| 505,649 | Chaney | Sept. 26, 1893 |
| 1,076,164 | Shoemaker | Oct. 21, 1913 |
| 1,454,577 | Eyster | May 8, 1923 |
| 1,473,098 | Hollenbeck et al. | Nov. 6, 1923 |
| 1,702,127 | Morgana et al. | Feb. 12, 1929 |
| 1,875,628 | Manson | Sept. 6, 1932 |
| 2,103,955 | Place | Dec. 28, 1937 |
| 2,120,036 | Northup | June 7, 1938 |
| 2,203,007 | Bartel et al. | June 4, 1940 |
| 2,255,248 | Gordon | Sept. 9, 1941 |
| 2,384,191 | Neely | Sept. 4, 1945 |
| 2,407,933 | Neely | Sept. 17, 1946 |
| 2,440,001 | Blumensaadt | Apr. 20, 1948 |

FOREIGN PATENTS

| Number | Country | Date |
| --- | --- | --- |
| 446,047 | Great Britain | Apr. 23, 1936 |